United States Patent [19]

Lieberg

[11] Patent Number: 4,643,460
[45] Date of Patent: Feb. 17, 1987

[54] HIGH PRESSURE CONCRETE LINE COUPLING CLAMP WITH LIMIT ADJUST APPARATUS

[75] Inventor: Dennis M. Lieberg, West Bend, Wis.

[73] Assignee: Construction Forms, Inc., Cedarburg, Wis.

[21] Appl. No.: 698,635

[22] Filed: Feb. 6, 1985

[51] Int. Cl.⁴ ............................................. F16L 17/00
[52] U.S. Cl. .................... 285/112; 285/365; 285/409; 24/271; 24/273; 74/586; 411/211; 411/294; 411/318; 411/348
[58] Field of Search .................. 285/112, 409, 365, 91, 285/82; 403/21, 328, 118, 343, 320, 43; 24/19, 270, 271, 273, 279, 280, 285; 74/526, 586, 89.15; 292/256.75; 411/209, 210, 211, 254, 255, 294, 315, 316, 317, 318, 348, 351

[56] References Cited

U.S. PATENT DOCUMENTS

| 661,558 | 11/1900 | Shuff | 403/328 |
|---|---|---|---|
| 1,210,669 | 1/1917 | Mike et al. | 411/211 |
| 2,198,333 | 4/1940 | Freeman | 74/586 |
| 2,244,124 | 6/1941 | Shemeley | 285/91 |
| 2,677,866 | 5/1954 | Tetzlaff | 24/279 |
| 2,824,717 | 2/1958 | Yeager | 24/270 |
| 3,302,960 | 2/1967 | Herrmann | 411/348 |
| 3,705,737 | 12/1972 | Westerlund et al. | 24/271 |
| 4,223,869 | 9/1980 | Patterson, III et al. | 24/279 |
| 4,433,854 | 2/1984 | Smith | 403/328 |

FOREIGN PATENT DOCUMENTS

| 530830 | 7/1954 | Belgium | 74/586 |
|---|---|---|---|
| 1062649 | 8/1959 | Fed. Rep. of Germany | 403/320 |
| 116338 | 4/1946 | Sweden | 403/43 |
| 152318 | 4/1932 | Switzerland | 411/348 |
| 733343 | 7/1955 | United Kingdom | 403/43 |
| 1031335 | 6/1966 | United Kingdom | 411/318 |
| 389331 | 10/1973 | U.S.S.R. | 403/43 |

Primary Examiner—Cornelius J. Husar
Assistant Examiner—Anthony Knight
Attorney, Agent, or Firm—Andrus, Sceales, Starke & Sawall

[57] ABSTRACT

A concrete pumping pipe coupling operates at nominal pressures of 2,000 psi and momentary peaks in excess of 3,000 psi. A two-piece hinged coupling forms a cylindrical enclosure encircling adjacent pipe ends. A two-piece latch releasably interconnects the ends of the two coupling sections. The latch includes a lever pivotally mounted to a link which is pivotally connected to the one coupling section. The lever pivots on a cam member connected to the other coupling section. The link includes a bolt threaded into an elongated nut. The threaded connection is for varying the length of the link. The elongated nut has an annular inner groove with a stop wall at each end. A spring-loaded limit pin is slidably mounted in a blind hole in the bolt and projects into the recess. The stop walls in the nut limits the movement of the bolt from the nut and thereby the extension of the link. This prevents accidentally setting of the link with a threaded engagement at a length insufficient to properly hold the pipe sections at the operating pressures.

8 Claims, 4 Drawing Figures

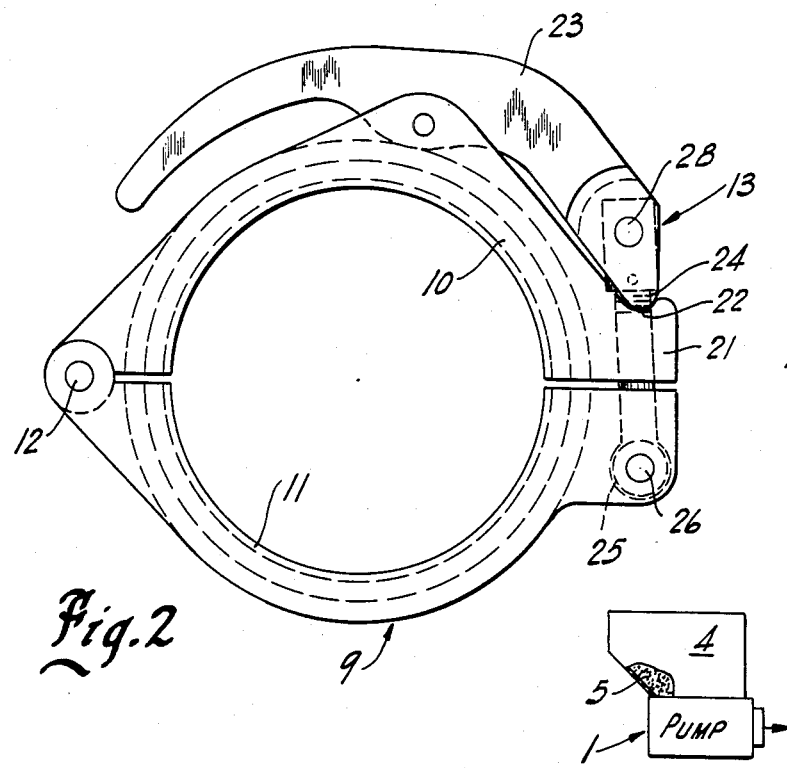
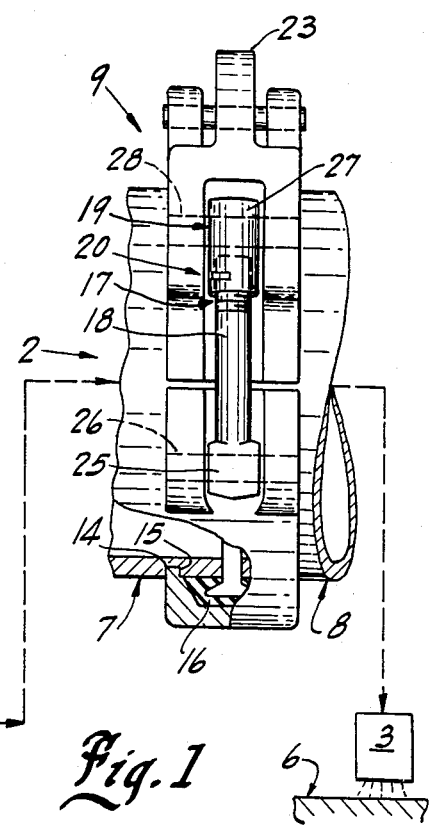
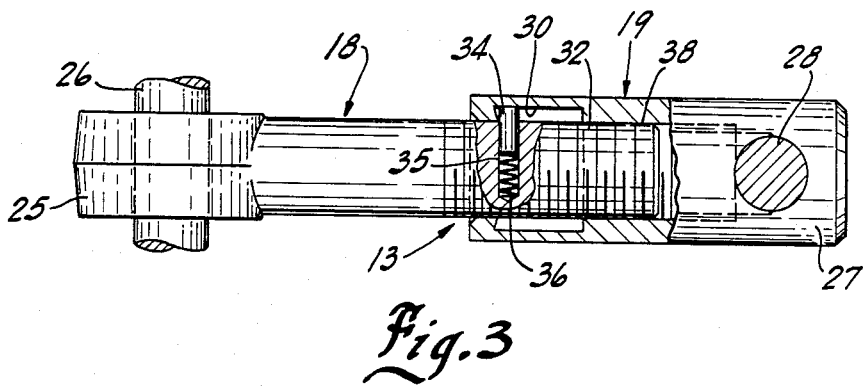
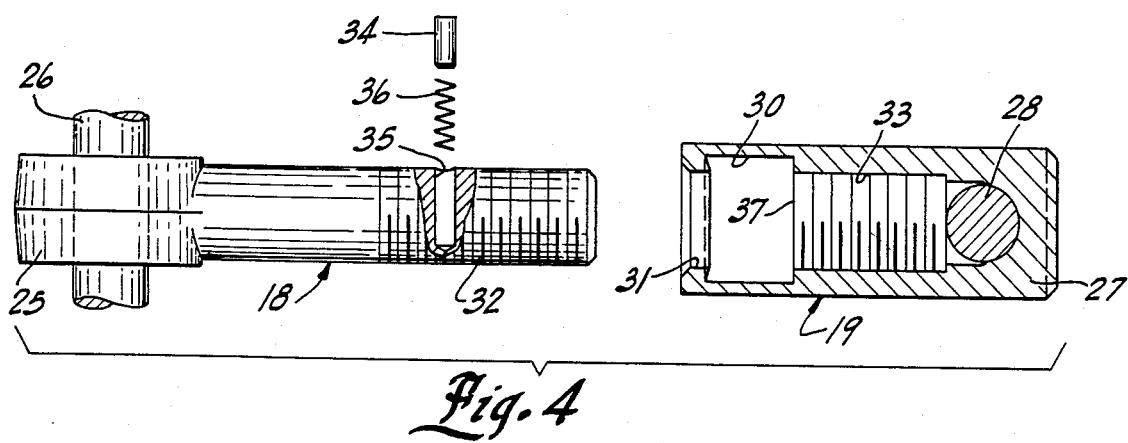

HIGH PRESSURE CONCRETE LINE COUPLING CLAMP WITH LIMIT ADJUST APPARATUS

The present invention relates to a high pressure line coupling for releasably interconnecting of flow lines in a high pressure transport system, and particularly a concrete pumping system.

In various industrial type applications, temporary flow systems are created for transport of semi-liquid mediums under high pressure. On-site concrete pumping systems are a typical example of a temporary flow transport system operating under high pressure and severe operating conditions. In the forming of structures of concrete, cement and the like, piston-type concrete pumps have been developed which in combination with appropriate pipe systems permit the transfer of the concrete material from a central location to the drop location on a job site. The concrete or like material is a semi-liquid mass which flows through a pipe line with sufficient pressure applied. Various concrete pumps have been developed to permit the transport of the semi-fluid concrete through temporary lines, which may have a length of a hundred or even a thousand feet or more. The flow lines are created on the job site by interconnecting of standard lengths of pipe, which may be a flexible hose or a rigid pipe. The pipe is provided with special flanged coupling ends adapted to receive an encircling clamp or coupling. The hose coupling is generally a circular clamp unit formed of two semi-circular sections pivotally interconnected at one end. A releasable latch interconnects the opposite free ends to permit opening of the coupling for assembly about the abutting ends of two pipe sections. The cross section of the members are generally U-shaped in cross section with a suitable sealing gasket disposed within the clamp and engaging appropriate pipe surfaces to establish an essentially liquid tight joint. The coupling must withstand the pumping pressures of approximately 2,000 psi, including surge pressures in the range of 3,500 to 4,000 psi. The coupling may be formed with a rigid link interconnecting a cam lever to the one coupling section and selectively engaging a cam member on the other coupling section. The rigid link is used because the high pressure clamp is designed for a particular pipe section. However as a practical matter different pipe sections will differ slightly and require slightly different closing characteristics for convenient closing of the coupling. To accommodate such slight variations, an adjustable clamping structure is preferably provided. A particularly satisfactory high pressure coupling for releasably connecting of adjacent concrete pump pipe sections is shown in U.S. Pat. No. 3,705,737 which issued on Dec. 12, 1972 to Westerlund et al and which is assigned to the assignee of this application. The latch disclosed in the above patents include a latch lever pivotally interconnected to the one coupling section by a link and releasably engaging a U-shaped cam surface on the opposite coupling section. The latch lever and link is pivoted on the cam surface to form an over-center latch which establishes the necessary high pressure coupling of the pipe sections. The connecting link is secured to the first section by an adjustable connection such as a threaded connection which allows adjustment of the length of the link, and thereby the length of the latch lever to accommodate normal tolerances in manufacture as well as limited build up of foreign matter within the coupling unit itself. In a concrete pumping environment, concrete tends to build up within the interior recessed face of the coupling. Hardened concrete interferes with the normal collapse of the two sections of the coupling into the intended circular configuration. Although the workers are instructed and should clean the coupling unit prior to assembly, for various reasons, the worker may merely unthread the lever connection slightly as needed to accommodate the build-up of foreign material within the coupling while permitting the closing of the clamp about the abutting hose ends. Within limits, a satisfactory operating seal can be established. In some instances, rupture of the connecting has been encountered, with a corresponding disruption in the pumping cycle. This not only requires shutting down the pumping system but results in loss of concrete, necessary cleanup expense and the like. Further, in view of the relatively high pumping pressure, a hazardous situation could be created. Apparently, where an unusual build-up of material has occurred the lever link has been unthreaded to a terminal portion of the threaded connection. The coupling is assembled in the normal manner without disruption of the connection. Under the high pumping pressures encountered however the number of engaged threads was insufficient to maintain the connection and the threaded connection of the link separates, thereby releasing the two coupling sections of the coupling.

Although the coupling unit with the adjustable lever is highly desirable to accommodate practical variations encountered in the field, the solid link has been widely used to prevent the workers from adjusting the clamp structure rather than cleaning thereof with the consequent misuse of the clamp structure.

There remains a distinct demand in the field of concrete pumping for an adjustable-type clamp with some means to prevent the inoperative setting of the clamp unit.

SUMMARY OF THE PRESENT INVENTION

The present invention is particularly directed to a high pressure pipe coupling having an adjustable latch mechanism or unit with means to positively prevent adjustment of the latch unit in a position of less than the rated holding capacity. Generally, in accordance with the teaching of the present invention, the coupling includes a connection link having an adjustment such as an adjustable connection to interconnect the lever to the one coupling section, with a special internal limit means on the threaded connection to positively prevent extension of the lever beyond a rated condition, and constructed and arranged to prevent bypassing of the safety feature. More particularly, in a preferred unique embodiment of the present invention, a threaded connection is provided with an internal spring loaded limit pin and recess. After assembly, the spring loaded pin moves from its recess in one member into the recess of the other threaded member and provides a specific limit on the related movement of the link. As the stop element is internal to the link, the user cannot defeat the limit control without essentially destroying of the link and therefore the coupling latch unit. The user cannot thus enlarge the coupling beyond the safe limit in order to accommodate build up of concrete or other foreign matter in the coupling and will necessarily proceed with the recommended procedure to clean the coupling.

The present invention thus provides an improved and safe coupling which is conveniently mass produced and with a clamp structure which has been accepted in the commercial concrete pumping systems.

BRIEF DESCRIPTION OF THE DRAWING

The drawing illustrates the best mode presently contemplated of carrying out the invention.

In the drawing:

FIG. 1 is a side elevational view of a coupling incorporating the subject invention and applied to interconnection of a pair of high pressure pipe sections in a concrete pumping system;

FIG. 2 is a cross sectional view through the coupling shown in FIG. 1 and more clearly illustrating the embodiment of the present invention;

FIG. 3 is an enlarged fragmentary view of a portion of the latch unit; and

FIG. 4 is an exploded view of the latch linkage illustrated in FIGS. 1 and 2.

DESCRIPTION OF THE ILLUSTRATED EMBODIMENT

Referring to the drawing and particularly to FIGS. 1 and 2 a concrete pumping system is illustrated including a high pressure concrete pump 1 connected by a sectionalized piping system 2 to a discharge nozzle 3. The concrete pump 1 has an input hopper 4 into which a supply of concrete 5 is placed. The concrete pump 1 discharges such concrete under a high pressure such that the semi fluid concrete flows through the piping system 2 to the remote discharge site 6. Such a system is well known and used for convenient on-site transport of the concrete from a convenient receiving station or location to the actual drop site 6. For example, in building of bridges, roads, buildings and other construction, a concrete truck cannot conveniently, and sometimes cannot possibly, move directly to the drop site. The concrete must then be manually or otherwise transported such as by automated buckets, a pipe system or the like to the placement location. The concrete pumping and piping system obviously allow much more convenient delivery of the concrete. To accommodate different configurations, the piping system is almost universally constructed from individual pipe sections 7-8 which are releasably interconnected to each other by a suitable releasable coupling 9. A highly satisfactory coupling is more fully disclosed in the previously identified U.S. Pat. No. 3,705,737, and the illustrated coupled is generally similar thereto. The coupling 9 is a encircling unit formed of two half sections 10 and 11 which are hingedly interconnected at one end, as at 12. A releasable latch unit 13 is interconnected to the opposite ends of the sections 10 and 11 for opening and closing of the encircling coupling 9.

As more fully shown in the enclosed patent, each end of pipes 7 and 8 is specially formed with an end recess 14. The pipe coupling has a generally U-shaped cross section which defines clamping lips 15 which move into the recesses to firmly couple the pipe sections in a liquid tight joint. A sealing gasket 16 is normally interposed into the coupling to establish the liquid tight joint. The demand of the liquid tight joint however require that the coupling be matched to the pipe diameter and that it accommodate normal manufacturing tolerances as well as a certain accumulation of foreign matter within the clamp unit. A threaded link unit 17 within the latch unit 13 includes a bolt 18 threaded into a nut 19 to permit adjustment of the coupling. In accordance with the teaching of the present invention, the link unit 17 includes an inernal stop limit mechanism 20 which positively limits the degree of adjustment within the link unit.

In such piping systems the pump may operate at a nominal pressure of 2,000 psi and substantially higher surge pressures will normally be encountered. For example, temporary obstructions and the like in the system can create pressures of 3,000 psi, and even higher pressures are not unexpected.

More particularly, the latch unit consists of a cam member 21 having a U-shaped cam surface 22 secured to the latch end of the one section 11. The U-shaped cam member 21 is formed as a pair of laterally spaced members integrally cast with the coupling section 11 and defining a center space. A latch lever 23 is a cast elongated arm having a curvature generally similar to the coupling. The lever 23 includes a bull nose 24 formed as a pair of laterally spaced similar members adapted to mate with the U-shaped cam surfaces 22. The coupling link unit 17 is pivotally connected between the bull-nose end of the lever arm. The opposite end of the link unit 17 is pivoted to and within the opposite sides of the latch cam member 21.

The link unit 17 as noted is formed as a two-piece threaded member to permit limited adjustment of the closed diameter of the coupling.

In the illustrated embodiment of the invention, the bolt 18 has as a aperatured eyelet 25 pivotally interconnected to the coupling section 11 as by a pivot pin 26. The nut 19 is an elongated tubular nut and includes an eyelet end 27 pivotally interconnected between the lever 23 by a pivot pin 28. The lever 23 is pivoted on the cam surface. Outward position of the lever 23 releases the pressure on the opposing coupling section 10 and 11 for opening of the coupling. To tighten the coupling the bull-nose 24 is placed in the U-shaped cam surfaces 22 with the handle in the open position. The lever 23 is pivoted into the adjacent coupling section 11 and through the linkage draws the two coupling sections together. In moving to the closed position, the lever 23 moves over a center position and thereby releasably locks the coupling in the closed position.

With the latch lever 23 in the release position, the lever 23 an be rotated thereby turning of the coupling bolt 18 into and out of the coupling nut 19.

In accordance with the present invention, the limit unit 20 is located internally of the bolt and nut link unit 17 and provides an inaccessible limit on the extension of the bolt and nut release position.

In the illustrated embodiment of the invention, as most clearly shown in FIG. 3, the nut 19 is formed with a recess 30 in the outer portion adjacent the open end. An outer lip 31 defines a restricted opening essentially corresponding to the diameter of the bolt 18. The lip 31 may be smooth or have an internal thread to mate with the threaded portion 32 of the bolt 18. The recess 30 extends inwardly for a length corresponding to the desired maximum extension of the interconnected bolt 18. The nut 19 has an extended threaded portion 33 located inwardly of the recess. The bolt 18 is threaded into the nut 19 and particularly inwardly of the recess 30 and into the threaded portion 33 during the assembly. In addition, the intermediate portion of the bolt 18 is provided with a coupling pin 34. The pin 34 is mounted in a radial opening 35 within the bolt 18 and a spring 36 biases the pin outwardly of the bolt 18.

In assembly, the pin 34 is forced inwardly against the force of spring 36 into the threads of the bolt, and the pin 18 is inserted and threaded into the nut 19. As the pin 34 moves past the lip 31, the pin 34 is of course released and moves outwardly under the force of the spring 36 into the recess 30. The pin 34 with the recess 30 forms a positive stop. The spring 36 is sufficiently strong to reliably hold the pin 34 in the extended position within recess 30. Thus, hammering or otherwise manipulating the lever cannot cause the pin to move from within the recess.

As the bolt 18 is threaded inwardly, the pin 34 moves into engagement with the inner edge 37 of the recess 30 limiting the inward movement. This limits the pressure which can be applied on closing of the latch lever. Opposite rotation of the bolt 18 results in the extension of the latch link as a bolt threads outwardly of the nut 18. At the desired limit, pin 34 engages the inside of the lip 31 and prevents any further outward movement of the bolt 19. At this outer limit, a minimum thread engagement is maintained between the threads of the bolt and the nut, as shown for example at 38 in FIG. 3. In a practical application applied to the high pressure concrete pump coupler, a minimum ⅝th inch length of thread engagement is maintained. Such engagement establishes a safe pressure response for the coupling in present high pressure concrete pumping systems.

The illustrated integral limit structure essentially prevents possible compromising of the system while establishing an effective and reliable limit means. Further, the pin and recess concept provides a reasonably inexpensive construction which can be readily incorporated into the prior art design of a coupler.

Various modes of carrying out the invention are contemplated as being within the scope of the following claims particularly pointing and distinctly claiming the subject matter which is regarded at the invention.

I claim:

1. A high pressure line coupling for coupling of pipe members in a flow line, comprising a plurality of curved sections defining a circular enclosure and including a pivot connection for pivoting a first section relative to a second section adjacent said first section, a releasable latch means connecting adjacent free end portions of said first and second sections and having a closed position with said sections forming said circular enclosure and a released position for pivoting of said sections, said latch means including an extensible link means including a first tubular link member and a second rod-like link member adjustably telescoped into said tubular link member and having telescoped overlapping portions, the extent of said overlapping portions establishing the length of said extensible link means and the relative position of said first and second sections in the closed position, said overlapping portions including means to hold the link members in fixed relationship to each other, and limit means coupled to said overlapping portions of said link members and substantially extending in the direction of the overlapping portions and limiting the relative extension of said link members to a minimum substantial overlapping portion, said limit means being totally located within said tubular link member and inaccessible without destruction of at least one of said link members to prevent bypassing of said limit means.

2. The coupling of claim 1 wherein said rod-like member is a bolt member and said tubular link member is an elongated nut member interconnected to each other by a threaded connection in said overlapping portions for varying the length of said link means, said limit means is located internally of and spaced from the ends of said nut member and said bolt member within said overlapping portions to limit the extension and contraction of said link means, said limit means includes a recess in one of said nut member and bolt member and a pin in the other of said nut and bolt members, said recess and said pin being totally enclosed by said nut member in all position of said nut and bolt members.

3. The coupling of claim 1 wherein said first and second sections are first and second semi-circular sections, said first semi-circular section having a cam member, a lever pivotally interconnected to the outer end of said second semi-circular section and having a cam end adapted to engage said cam member, said lever being pivoted on said cam member between said closed position and said released position.

4. The coupling of claim 3 wherein said link members are a bolt and a nut interconnected by a threaded connection, said limit means being located internally of said nut and bolt and including a recess in one of said nut and bolt and a pin in the other of said nut and bolt.

5. A high pressure concrete line coupling for coupling of pipe sections into a concrete flow line operable at a nominal pressure in excess of 2,000 psi, comprising a plurality of curved sections defining a circular enclosure and including a pivot connection for pivoting a first section relative to a second section adjacent said first section, said first and second sections having adjacent free end portions, a releasable latch means connecting said adjacent free end portions of said first and second sections, said latch means including a pivotal operating arm and an adjustable link means connecting said arm to one of said sections, the length of said adjustable link means establishes the relative positioning of said first and second sections in the closed position, said adjustable link means including a first rod-like link member extending into a second tubular link member, said first and second link members being adjustably set in fixed relationship to each other and having a maximum overlapping position and a safe minimum overlapping position of the link members with the minimum safe overlapping position equal to a substantial part of said maximum overlapping position, and first and second limit elements secured to opposing and complementing portions of said telescoping link members, said limit elements permitting substantial extension of said telescoping link members from said maximum overlapping position to said minimum overlapping position and preventing extension beyond said safe minimum overlapping position and being totally enclosed by said tubular link member in both of said overlapping position.

6. The coupling of claim 5 wherein said limit means includes a pin in one of said link members and a recess in the other of said link members.

7. The coupling of claim 6 wherein said first link member is a bolt and said second link member is a nut connected to said bolt by a threaded connection, said recess being in said nut.

8. A releasable concrete pumping pipe coupling for interconnecting of pipe sections into a flow line particularly adapted for transport of concrete at nominal pressures of 2,000 psi and subjected to momentary peak pressures in excess of 3,000 psi, comprising a plurality of coupling sections interconnected to each other to define a substantially cylindrical enclosure in the closed position for encircling the adjacent ends of pipe sections, said coupling sections being coupled to each other and including at least one hinged joint permitting relative pivotal movement of the sections to the opposite side of said hinge joint, a two-piece latch means interconnected to a pair of adjacent pivotal sections and including a lever pivotally mounted to move between a released position and a closed position to establish said cylindrical enclosure with a relatively high closing pressure, said latch means including a link unit pivotally connected to a first of said relatively pivotal sections and to said lever, a cam member connected to the second of said relatively pivotal sections, said link unit including a bolt member and an elongated nut member having an outer end into which an other end of said bolt member is threaded for varying the length of said link unit, and a limit means including an extended annular recess located internally of said nut member adjacent the outer end and including a pin in said adjacent bolt member projecting into said annular recess to limit outward threading of said bolt member and thereby extension of said link unit, said annular recess nut enclosing said recess and pin, said lever being pivotally interconnected to the outer end of said link unit and having a cam end adapted to engage said cam member, said lever being pivoted on said cam member between said closed position and said released position.

* * * * *